(12) United States Patent
Liron et al.

(10) Patent No.: US 12,495,068 B2
(45) Date of Patent: Dec. 9, 2025

(54) PROTECTING FROM DENIAL OF SERVICE ATTACKS

(71) Applicant: Mellanox Technologies, Ltd., Yokneam (IL)

(72) Inventors: Gabi Liron, Yokneam Illit (IL); Moshe Shemesh, Tel Aviv (IL); Chen Gonen, Yeruham (IL)

(73) Assignee: Mellanox Technologies, Ltd., Yokneam (IL)

( * ) Notice: Subject to any disclaimer, the term of this patent is extended or adjusted under 35 U.S.C. 154(b) by 75 days.

(21) Appl. No.: 18/634,829

(22) Filed: Apr. 12, 2024

(65) Prior Publication Data

US 2025/0323937 A1 Oct. 16, 2025

(51) Int. Cl.
*H04L 9/40* (2022.01)
*G06F 9/455* (2018.01)

(52) U.S. Cl.
CPC ...... *H04L 63/1458* (2013.01); *G06F 9/45558* (2013.01); *G06F 2009/45575* (2013.01)

(58) Field of Classification Search
CPC .............. H04L 63/1458; G06F 9/45558
See application file for complete search history.

(56) References Cited

U.S. PATENT DOCUMENTS

| | | | |
|---|---|---|---|
| 11,595,408 B2 | 2/2023 | Beddus et al. | |
| 11,700,190 B2 | 7/2023 | Yadav et al. | |
| 2012/0075314 A1* | 3/2012 | Malakapalli | G06T 1/20 718/1 |
| 2012/0254993 A1* | 10/2012 | Sallam | G06F 9/45558 718/1 |
| 2014/0059688 A1* | 2/2014 | Margalit | G06F 21/561 726/24 |
| 2016/0224383 A1* | 8/2016 | Bonzini | G06F 9/45558 |
| 2017/0277554 A1* | 9/2017 | Oehrlein | H04L 41/0895 |
| 2017/0286311 A1* | 10/2017 | Juenemann | G06F 12/10 |
| 2023/0275906 A1 | 8/2023 | Zohar et al. | |

FOREIGN PATENT DOCUMENTS

| | | | | |
|---|---|---|---|---|
| CN | 112015516 A | * | 12/2020 | ......... G06F 9/45558 |
| EP | 2867811 B1 | | 10/2018 | |
| EP | 3633951 B1 | * | 9/2024 | ......... H04L 63/1416 |

OTHER PUBLICATIONS

Extended European Search Report for Application No. 25169966.6, mailed Jun. 3, 2025, 13 pages.

Zhang et al., "DOS Attack on Your Memory in the Cloud," retrieved from <https://dl.acm.org/doi/pdf/10.1145/3052973.3052978,> Apr. 2, 2017, 13 pages.

\* cited by examiner

*Primary Examiner* — Clayton R Williams
(74) *Attorney, Agent, or Firm* — Davis Wright Tremaine LLP

(57) ABSTRACT

Apparatuses, systems, and techniques to detect a Denial of Service (DoS) attack on a target device by an entity. In at least one embodiment, the detection is followed by an event message to prevent the entity from sending further communications to the target device.

35 Claims, 10 Drawing Sheets

US 12,495,068 B2

PROTECTING FROM DENIAL OF SERVICE ATTACKS

TECHNICAL FIELD

At least one embodiment pertains to processing resources used to prevent or minimize Denial of Service (DoS) attacks on a computing system. For example, at least one embodiment pertains to detecting a DoS attack and/or halting a DoS attack.

BACKGROUND

Denial of Service (DoS) attacks can reduce the available communication bandwidth of a computing system to near zero. Conventional techniques may be slow to identify a DoS attack and/or slow to halt the attack. Speedy detection of a DoS attack followed by remedial action that can halt a DoS attack before it has a crippling effect on the computing system may be improved.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
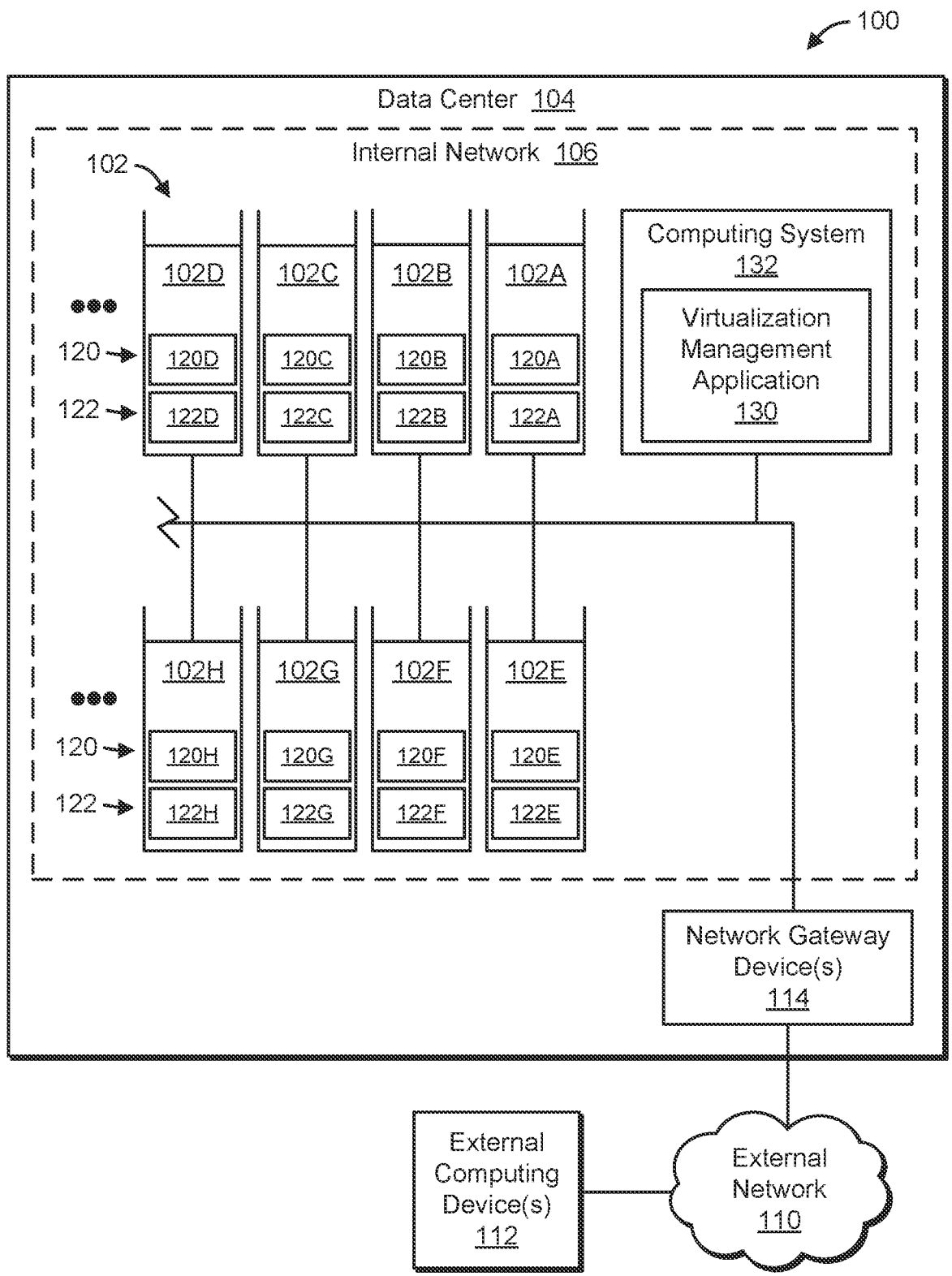
FIG. 1 illustrates example components of an example system, in accordance with at least one embodiment.

The present application is directed toward various embodiments for detecting and stopping potential Denial of Service (DoS) attacks against a target device (e.g., a Peripheral Component Interconnect Express ("PCIe") device). FIG. 1 illustrates example components of an example system 100, in accordance with at least one embodiment. The system 100 may detect and/or terminate a DoS attack conducted against one or more target devices. The system 100 includes one or more computing devices or systems (e.g., one or more servers 102). In FIG. 1, the server(s) 102 are illustrated as including servers 102A-102H. However, the server(s) 102 may include any number of servers, including a single server. By way of a non-limiting example, the server(s) 102 may implement (e.g., be a component of) another system, such as a data center 104, a cloud computing system, a machine learning system (e.g., utilizing one or more neural networks), an autonomous machine (e.g., an autonomous vehicle), medical imaging equipment, and/or the like.

When the server(s) 102 include(s) multiple servers (e.g., the servers 102A-102H), the server(s) 102 may be connected together to form an internal network 106. The internal network 106 may include one or more networking devices (not shown), such as switches and/or routers, that route data traffic within the internal network 106 to and from one or more of the server(s) 102. For example, the networking device(s) (not shown) may route the data traffic between two or more of the server(s) 102.

The server(s) 102 may be connected (e.g., via the internal network 106) to an external network 110 (e.g., the Internet) that connects one or more external computing devices 112 with the server(s) 102. The server(s) 102 and/or the internal network 106 may be connected to the external network 110 by one or more network gateway devices 114 that route(s) traffic between the external network 110 and the server(s) 102 (e.g., via the internal network 106). The network gateway device(s) 114 may be characterized as providing an interface between the external network 110 (e.g., the Internet) and the server(s) 102 (e.g., via the internal network 106).

The system 100 may implement one or more hypervisors 120. Each of the hypervisor(s) 120 is a virtual machine manager, which may create and manage execution of one or more Virtual Machines ("VM(s)"). The VM(s) may perform one or more workloads (e.g., provided by a customer of the system 100, for example, operating one of the external computing device(s) 112). In the embodiment illustrated, each of the server(s) 102 implements a different one of the hypervisor(s) 120. Thus, FIG. 1 illustrates hypervisors 120A-120H implemented by the servers 102A-102H, respectively. By way of non-limiting examples, the hypervisor(s) 120 may be implemented using VMware ESX software, VMware ESXi software, Hyper-V software, Kernel-based Virtual Machine ("KVM") software, and/or the like.

Each of the server(s) 102 may include at least one network interface 122 that connects the server to the internal network 106. The network interface 122 may be implemented as a network interface controller ("NIC") and different instances of the network interface 122 may each be installed in different ones of the server(s) 102 (e.g., inside the data center 104). By way of a non-limiting example, the servers 102A-102H may include network interfaces 122A-122H, respectively.

The system 100 may implement a virtualization management application 130 (e.g., executing on a computing system 132). The virtualization management application 130 and/or the hypervisor(s) 120 may select hardware components of the server(s) 102 to implement the VM(s) to perform one or more workloads. The virtualization management application 130 may monitor the performance of the workloads (e.g., being executed by VMs) on the server(s) 102.

The computing system 132 and/or another computing system (e.g., one of the server(s) 102) may include memory (e.g., one or more non-transitory processor-readable medium) storing machine executable instructions that when executed by one or more processors of the computing system 132 implement the virtualization management application 130. The processor(s) may be implemented, for example, using a main central processing unit ("CPU") complex, one or more microprocessors, one or more microcontrollers, one or more graphics processing units ("GPU(s)"), one or more data processing units ("DPU(s)"), and/or the like. By way of additional non-limiting examples, the memory (e.g., one or more non-transitory processor-readable medium) may be implemented, for example, using volatile memory (e.g., dynamic random-access memory ("DRAM")) and/or nonvolatile memory (e.g., a hard drive, a solid-state device ("SSD"), and/or the like).

Figure 2:
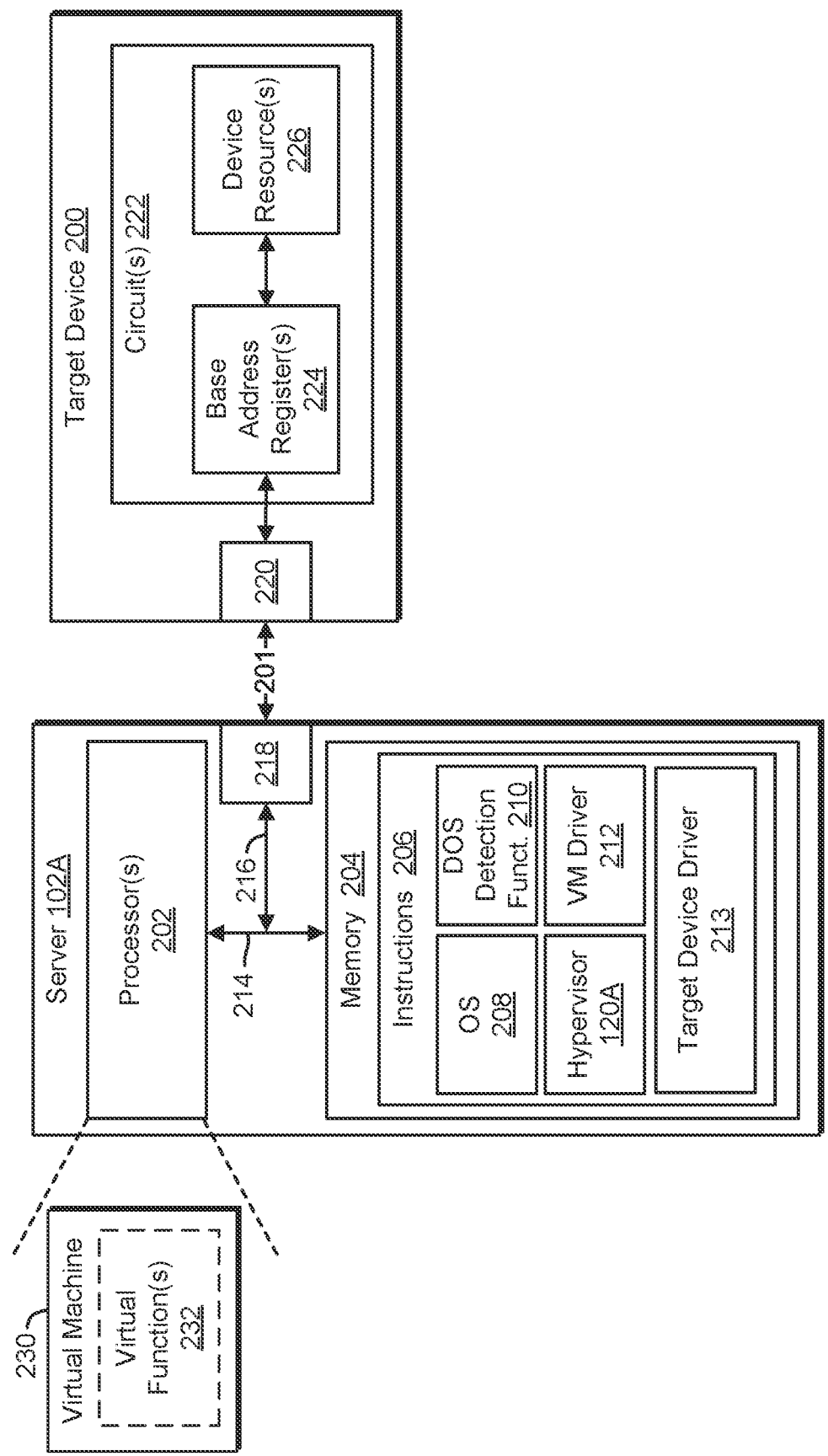
FIG. 2 illustrates a block diagram illustrating example components of a target device, in accordance with at least one embodiment.

FIG. 2 illustrates a block diagram illustrating example components of a target device 200, in accordance with at least one embodiment. The target device 200 may be implemented as a PCIe device, PCI device, the network interface 122, a peripheral device, and/or the like. By way of non-limiting examples, the target device 200 may be implemented as a graphics device, a network device, one or more parallel processing units ("PPU(s)"), one or more graphics processing units ("GPU(s)"), and/or the like.

The target device 200 may be connected to one of the server(s) 102 of FIG. 1. For case of illustration, the target device 200 has been illustrated as being connected (e.g., by a communication link 201) to the server 102A, which at least partially implement the system 100 (see FIG. 1).

Each of the server(s) 102 includes at least one processor connected to memory storing instructions. In the embodiment illustrated, the server 102A includes at least one processor 202 connected to memory 204 storing instructions 206. The instructions 206 are executable by the processor(s) 202 and may include instructions implementing an operating system 208, DoS detection functionality 210, a VM driver 212, a target device driver 213, and/or the hypervisor 120A. When executed by the processor(s) 202, instructions implementing the operating system 208 may perform production tasks, such as performing a workload. When executed by the processor(s) 202, instructions implementing the detection and halt functionality 210 may detect and/or halt a DoS attack on the target device 200. When executed by the processor(s) 202, instructions implementing the VM driver 212 may initiate and/or manage performance of a VM 230. When executed by the processor(s) 202, instructions implementing the target device driver 213 may enable communication with the target device 200. The processor(s) 202 may be implemented, for example, using a main central processing unit ("CPU") complex, one or more microprocessors, one or more microcontrollers, one or more graphics processing units ("GPUs"), one or more DPUs, and/or the like. The memory 204 (e.g., one or more non-transitory processor-readable medium) may be implemented, for example, using volatile memory (e.g., dynamic random-access memory ("DRAM")) and/or nonvolatile memory.

While the VM 230 is illustrated as being performed by the same server 102A connected to the target device 200. This is not a requirement, and the VM 230 may be executed by one or more other ones of the server(s) 102.

The processor(s) 202 may be connected to the memory 204 by one or more buses 214. A bus 216 (e.g., a PCIe bus, a PCI bus, and/or the like) may connect the bus(es) 214 to a communication port 218. The communication port 218 may be connected to the communication link 201 that is connected to the target device 200.

The target device 200 includes at least one system connection 220 and one or more circuits 222. When the target device 200 is the network interface 122 (see FIG. 1), the target device 200 may include a network connection (not shown) that is connected to the circuit(s) 222 and may be connected to the internal network 106 (see FIG. 1). By way of a non-limiting example, the network connection may be implemented as an Ethernet connection. The network connection may receive inbound data (e.g., from the internal network 106) addressed to the server 102A and route that inbound data to the circuit(s) 222. The system connection 220 is connected to the circuit(s) 222 and the communication link 201, which is connected to the server 102A. By way of a non-limiting example, the system connection 220 may be implemented as a PCIe connection. The system connection 220 receives data (e.g., the inbound data) from the circuit(s) 222 and routes the data to the server 102A.

The circuit(s) 222 implement(s) one or more base address registers ("BAR(s)") 224 connected to one or more device resources 226, including device memory addressed by the BAR(s). When an external device (e.g., the server 102A) attempts to access the target device 200 via the system connection 220, the external device uses the BAR(s) 224 to communicate with the target device 200 using the device memory addressed by the BAR(s), which may be referred to herein as the BAR region.

As mentioned above, the hypervisor 120A is a virtual machine manager, which may create and manage execution of one or more VMs, which may perform one or more workloads (e.g., provided by a customer of the system 100, for example, operating one of the external computing device(s) 112). Although a typical implementation of the system 100 may implement many virtual machines, FIG. 2 is shown in a simplistic form and illustrates only the single example VM 230 and the single target device 200. However, the server 102A and/or the system 100 may implement one or more VMs like the VM 230. In the example of FIG. 1, the VM 230 implements one or more virtual functions ("VF") 232 running within the VM 230.

In at least one embodiment, the DoS attack targets one or more of BAR regions addressed by the BAR(s) 224 within the target device 200. DoS attacks on the BAR region(s) occur when a bad actor (e.g., one or more VFs 232 running within the VM 230) sends a large number of requests that overload the ability of the target device 200 to handle these requests in a timely manner, and cause the target device 200 to generate back pressure on the bus 216 (e.g., a PCIe bus), which may cause the target device 200 to stop receiving and/or responding to requests. In at least one embodiment, the DoS attack may be conducted by the VF(s) 232 running within the VM 230 managed by the hypervisor 120A and associated with a tenant of the data center 104 (see FIG. 1). If the DoS attack were to be successful in a multi-tenant environment (e.g., such as a cloud computing environment), access to one or more of the BAR region addressed by the BAR(s) 224 by other tenants using the same target device 200 (e.g., the network interface 122A of the server 102A) would be prevented. This can result in the other tenants being prevented from accessing services provided by the target device 200 (e.g., access to the network, storage, etc.).

As mentioned above, the target device 200 (and/or hardware for use with PCIe) includes the BAR(s) 224 that specify how much address space the target device 200 exposes to the OS 208 of a host computing system (e.g., the server 102A). The BAR(s) is/are mapped to the device resource(s) 226 and, after device or hardware enumeration by the processor(s) 202 (e.g., CPU) of the host computing system, each of the BAR(s) 224 stores a base address of a block of address space having a size specified by the hardware of the target device 200. The BAR(s) 224 is/are mapped to the device resource(s) 226 (e.g., the BAR region memory space) inside the hardware of the target device 200 and, after enumeration, software (e.g., a target device driver 213) executed by the host computing system (e.g., the server 102A) can read and/or write to the device resource(s) 226 (e.g., the memory space) using the mapped addresses assigned to the BAR(s) 224 by the OS 208. For example, the software (e.g., the target device driver 213) may write information (e.g., referred to as a doorbell) to the address(es) mapped to the hardware of the target device 200 by the host computing system (referred to as writing to the BAR(s) 224). A memory controller in the processor(s) 202 (e.g., CPU), a PCIe Root-Complex, and/or a PCIe device tree may direct a memory access to the target device 200 instead of to main memory of the host computing device (e.g., the memory 204 of the server 102A).

Some BAR regions (e.g., one or more of the memory locations addressed by the BAR(s) 224) may be lossless, which means if the software (e.g., the target device driver 213) writes to a BAR region, the request cannot be thrown out or ignored by the target device 200. When a request is ignored, the target device 200 may malfunction. To help prevent doorbells from being thrown out or ignored, subsequently received doorbells may be stored in PCI buffers while the target device 200 finishes servicing or processing previously received doorbells.

Like hardware, firmware within the target device 200 may have or be mapped to one or more BAR regions that are enumerated by the OS 208 and operate like the BAR(s) 224 discussed above except with respect to firmware, instead of hardware. In at least one embodiment, at least one of the BAR(s) 224 is mapped to firmware. That is, such a BAR is mapped to memory space inside the hardware of the target device 200 used by the firmware and, after enumeration, software (e.g., the target device driver 213) executed by the host computing system may read and/or write to that memory space using the mapped addresses assigned to the BAR by the OS 208. Firmware processing time is typically longer than hardware processing time.

The BAR(s) 224 may be exposed to the hypervisor 120A, which is generally considered to be a trusted entity, and, in some cases, the BAR(s) 224 may be exposed to virtualized entities, such as virtual functions. Such virtualized entities are generally considered to be less trusted than the hypervisor 120A.

In PCIe, credits are used to regulate flow of data between transmitter and receiver devices. For example, when using doorbells, the processor(s) 202 (e.g. CPU) may be the transmitter and the target device 200 may be considered to be the receiver device (e.g., hardware and/or firmware). Thus, when the processor(s) 202 (e.g., CPU) sends a doorbell to the target device 200 (via the BAR(s) 224), the processor(s) 202 (e.g., CPU) uses a credit to indicate that the processor(s) 202 (e.g., CPU) has consumed a first-in-first-out ("FIFO") storage area (to store the doorbell). The storage area may be a PCI buffer used to store doorbells. If the target device 200 receives the doorbell, the target device 200 sends an acknowledgement (e.g., a PCIe updateFC DLLPs) to the processor(s) 202 (e.g., CPU), which releases the credit. On the other hand, if the target device 200 does not send the acknowledgement, the credit is not released and the processor(s) 202 (e.g., CPU) will eventually run out of credits and stop sending doorbells, which creates back pressure. Thus, the PCIe credits (and therefore possible backpressure) are managed for the entire link and not for a physical function ("PF") or a VF (e.g., one of the VF(s) 232). This means that a VF generating a doorbell storm will exhaust link credits and will affect other users of the same PCIe link (e.g., other PFs and/or VFs). Therefore, if the BAR(s) of the hardware and/or firmware are bombarded with doorbells at a rate higher than their capacity to service those doorbells, back pressure results. This means the hardware and/or firmware are so busy that they do not send acknowledgements and CPU cannot release the credits. Because credits are required for the CPU to send more doorbells (e.g., notifications to firmware and/or hardware that tasks are pending), a denial of service to the PCIe link and/or the BAR may result. For example, a single x86 core can generate doorbells at a rate of 200K/second. At this rate, doorbells may quickly fill the PCI buffers and generate back pressure on the communication link. Because the ability to cause back pressure is dependent on the ability of the target device 200 to return credits, accesses to addresses that require more time for the target device 200 to service will increase the likelihood that backpressure may occur. Such cases may be more likely, but are not limited to, addresses that are serviced by firmware.

Figure 3:
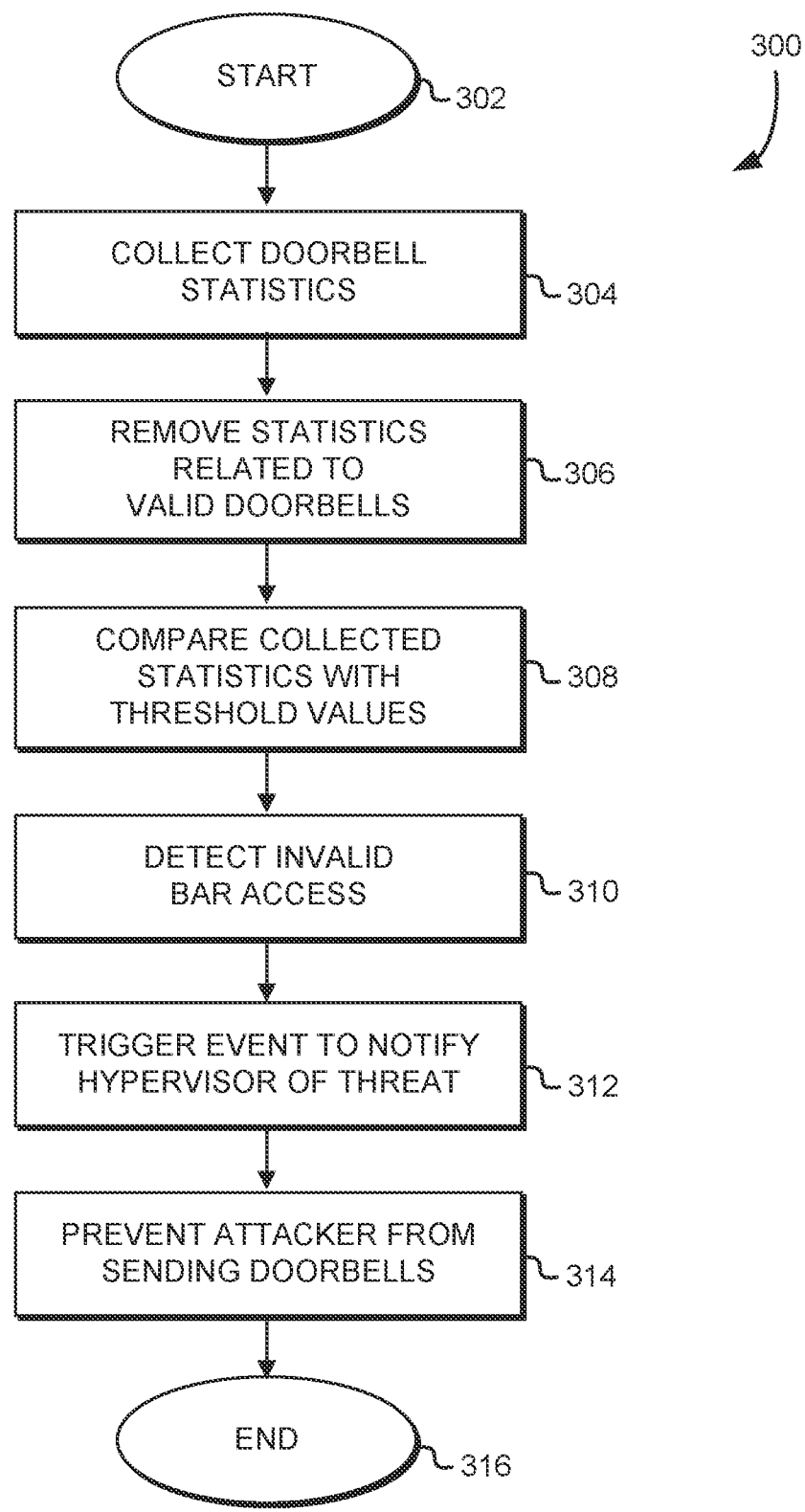
FIG. 3 illustrates a flowchart of an example process of detecting and stopping DoS attacks, in accordance with at least one embodiment.

FIG. 3 illustrates a flowchart 300 of an example process of detecting and stopping such DoS attacks, in accordance with at least one embodiment. The process of FIG. 3 may be performed by software and/or firmware (e.g., the detection and halt functionality 210) operating in a computing device (e.g., a server in the data center). To detect an attack, the computing device gathers statistics with respect to doorbells in step 302. For example, counters may be used to compute a number of doorbells and/or doorbell rates for each entity (e.g., a VF and/or a VM) writing to each of the BAR(s). In step 308, the statistics may be compared to one or more threshold values to determine whether any of the entities are sending too many doorbells to any of the BAR(s), indicating the entity(ies) is/are attacking such BAR(s). The statistics may distinguish between valid BAR accesses (or valid doorbells) and invalid BAR accesses (or invalid doorbells). The statistics and thresholds maintained by the computing device (e.g., the server 102A) might vary based on BAR or addresses within a BAR to reflect the expected device handling latency and the likelihood of software posting doorbells to these areas. For example, doorbells to one area might be allowed at a high rate while doorbells may be allowed to another at a lower rate. The computing device may compensate for the valid doorbells and/or other measurement inaccuracies to avoid erroneously detecting a DoS attack when none is occurring (e.g., false alarms). For example, the valid BAR accesses may be removed from the statistics altogether, as illustrated in step 306.

The computing device may identify a valid BAR access by determining whether a target (e.g., hardware or firmware) associated with a BAR responds to a BAR access in an expected manner that indicates an entity (e.g., a VF and/or a VM) is using the target for a legitimate purpose. By way of another non-limiting example, the target may limit the number of BAR accesses by an entity (e.g., a VF) to a predetermined number (e.g., 32), at least some of which may be stored in a PCI buffer while they await processing by the hardware. If the entity sends more than the predetermined number of BAR accesses to the target, BAR accesses by the entity may be determined (e.g., by the detection and halt functionality 210) to be invalid because the entity was supposed to wait until the predetermined number of BAR accesses were processed before sending more. By way of yet another example, BAR accesses may be determined to be invalid if the entity is writing to one or more of the BAR(s) that the entity is not supposed to access. Further, the target may define one or more rules with regard to BAR accesses and any BAR accesses that fail to follow those rules may be determined to be invalid. Any entity associated with a number of invalid BAR accesses that exceed a predetermined limit, may be identified as potentially attacking one or more of the BARs. Using these techniques alone or in combination, the computing device detects an invalid BAR access in step 310.

To stop a potential attack, the computing device triggers an event, in step 312, that notifies the hypervisor (e.g., via a kernel driver, a file, a message, and/or the like) operating with respect to the computing device. The hypervisor (e.g., collaborating with security software running within and/or under the control of the hypervisor) stops the attacker (e.g., a VM using a VF of the target device 200) from continuing to generate doorbells in step 314. The hypervisor and/or an administrator (e.g., operating the virtualization management application 130) may disable the VM by disconnecting it using standard OS tools (e.g., using a virtual shell to enter a command to terminate the VM). The process may end after step 314 at 316. However, in normal operation, the process in FIG. 3 is in continuous operation to monitor for the DoS attacks.

Thus, the process in FIG. 3 may monitor doorbell rates and search for any VF and/or VM that exceeds a predetermined limit. The process may trigger an event received by the hypervisor for any VF and/or VM that exceeds the predetermined limit.

Figure 4:
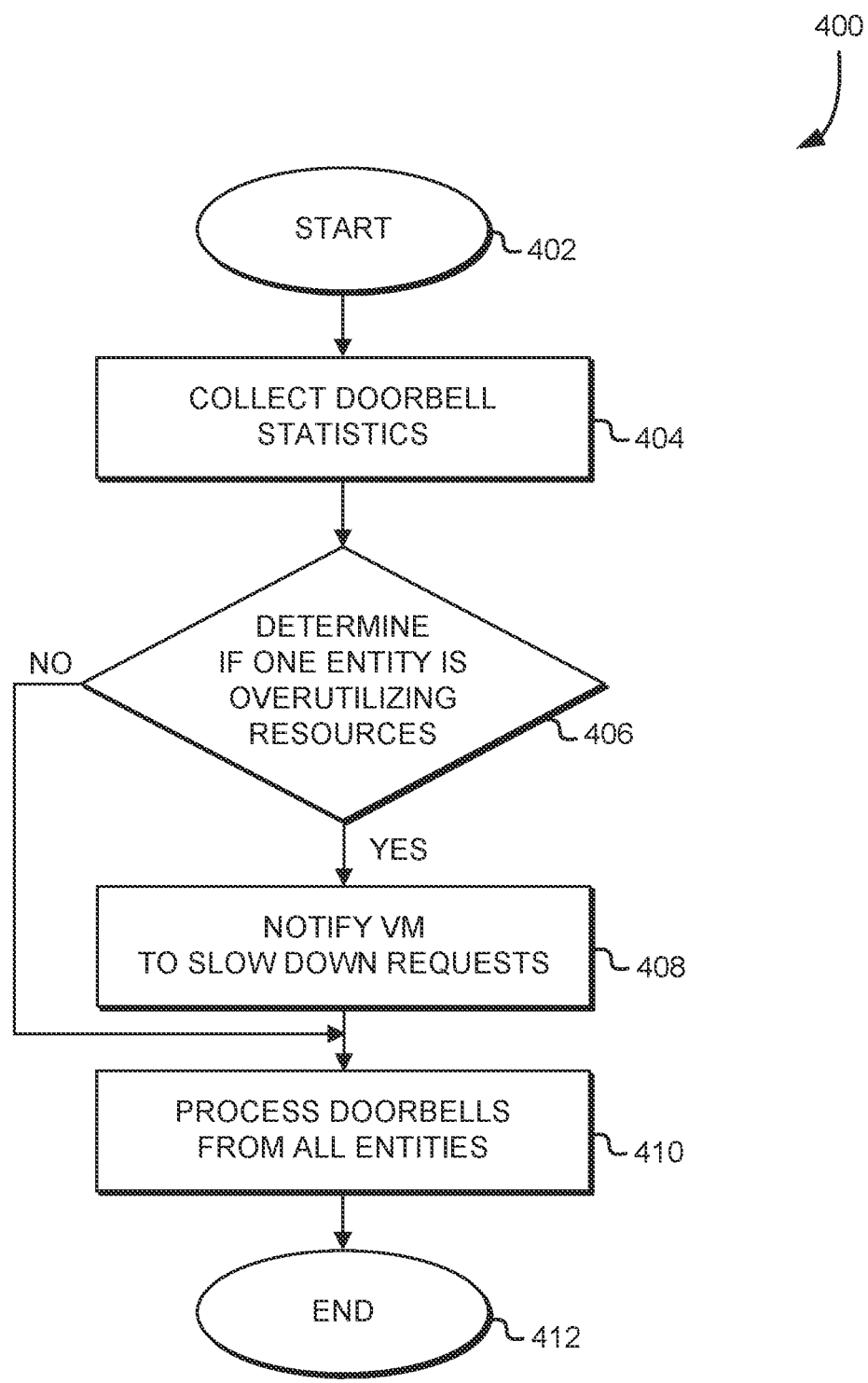
FIG. 4 is a flowchart illustrating another example process of detecting and stopping DoS attacks, in accordance with at least one embodiment.

Sometimes, a few (e.g., one or two) entities (e.g., VFs and/or VMs) write a disproportionate number of doorbells to a particular BAR. FIG. 4 is a flowchart 400 illustrating another example process of detecting a DoS attack, in accordance with at least one embodiment. The process of FIG. 4, which starts at 402, may be performed by software and/or firmware (e.g., the detection and halt functionality 210) operating in a computing device (e.g., a server in the data center). As mentioned above, the computing device (e.g., the server 102A) may monitor statistics with regard to each entity and each of the BAR(s) (e.g., an amount of CPU time spent processing doorbells received by each BAR from each entity), as illustrated at step 404. In decision 406, the computing device may use a threshold value to determine whether statistics associated with a particular entity indicate that entity is using too many resources (e.g., the entity is using too much CPU time) with respect to other entities. In at least one embodiment, the resource demands of the suspected attacker can be compared to the overall resource demands of all the other entities (e.g., a threshold value may be a percentage of the overall resource utilization). In at least one embodiment, the resource demands of the suspected attacker can be compared to an average resource demand of all the other entities (e.g., a threshold value may be based on the average resource utilization of the other entities).

If the entity is determined to be using too many resources, the result of decision 406 is YES and in step 408 the computing device notifies the VM that it needs to slow down its requests (e.g., throttle the doorbells). The throttling may be performed by a VM driver associated with the VM (e.g., the VM driver 212 associated with the VM 230). If the VM driver and/or the VM does not comply with the request, the VM may be labeled as a DoS attacker and/or shut down. In other words, the computing device may request that the entity stop monopolizing hardware and/or firmware of the target device (e.g., the target device 200) and/or implementing a DoS attack. For example, the statistics may be used to balance resource utilization across those entities using a particular BAR such that no one entity is allowed to monopolize the hardware and/or firmware associated with the BAR and prevent other entities from using that hardware and/or firmware. In other words, the computing device may cooperate with or cause the VM to penalize itself for requesting too much work at the risk of being marked as a DoS attacker. The VM driver (assuming it is not a DoS attacker) should play by the rules and may slow down its requests (doorbells).

If the entity is determined not to be using too many resources, the result of decision 406 is NO and in step 410 the computing device may be performing doorbells received from all entities without a delay for any particular entity. The utilization analysis process ends at 412. However, in normal operation, the process in FIG. 4 is in continuous operation to monitor for resource overutilization by any one or more entities with respect to other entities.

Figure 5A:
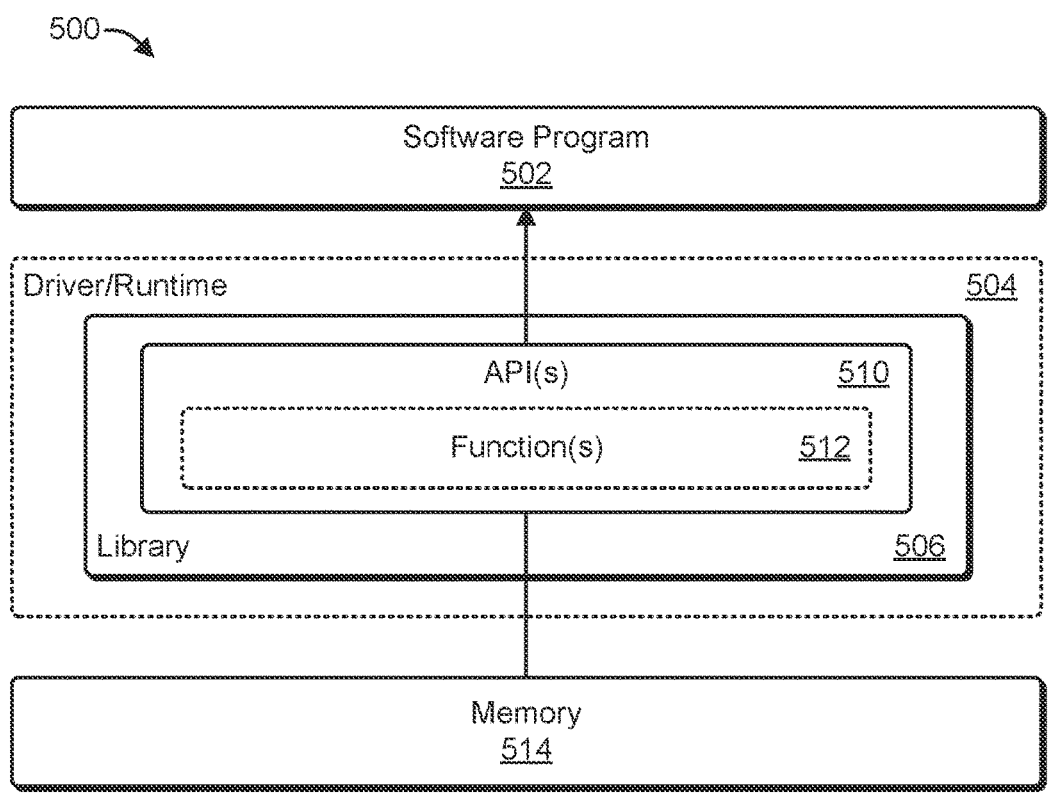
FIG. 5A illustrates an example of a system that includes a driver and/or runtime including one or more libraries to provide one or more application programming interfaces (APIs), according to at least one embodiment.

FIG. 5A illustrates an example of a system 500 that includes one or more drivers and/or one or more runtimes (illustrated as reference numeral 504) including one or more libraries 506 to provide one or more application programming interfaces ("API(s)") 510, in accordance with at least one embodiment. In at least one embodiment, the system 500 includes the driver(s) 504 and/or the runtime(s) 504 including the library(ies) 506 to provide to the API(s) 510. In at least one embodiment, the API(s) 510 is/are sets of software instructions that, if executed, cause one or more processors (e.g., processor(s) 522 illustrated in FIG. 5B) to perform one or more computational operations. In at least one embodiment, one or more of the API(s) 510 is/are distributed or otherwise provided as a part of one or more of the library(ies) 506, one or more of the runtime(s) 504, one or more of the driver(s) 504, and/or one or more component of any other grouping of software and/or executable code further described herein. In at least one embodiment, one or more of the API(s) 510 perform one or more computational operations in response to invocation by one or more software programs 502.

In at least one embodiment, one or more of the software program(s) 502 is/are a software module and/or include(s) one or more software modules. In at least one embodiment, a software module is as further illustrated non-exclusively in FIG. 5B as one or more modules 524 and described with respect thereto. In at least one embodiment, one or more of the software program(s) 502 is/are a collection of software code, commands, instructions, and/or other sequences of text to instruct a computing device (e.g., the server(s) 102 or the target device 200) to perform one or more computational operations and/or invoke one or more other sets of instructions, such as the API(s) 510 or API function(s) 512, to be executed by the computing device. In at least one embodiment, functionality provided by one or more of the API(s) 510 includes the API function(s) 512, such as those usable to accelerate one or more portions of the software program(s) 502 using one or more parallel processing units (PPUs), such as graphics processing units (GPUs).

In at least one embodiment, one or more of the API(s) 510 is/are one or more hardware interfaces to one or more circuits to perform one or more computational operations. In at least one embodiment, one or more of the API(s) 510 described herein are implemented as one or more circuits to perform one or more techniques described in connection with FIGS. 1 through 4. In at least one embodiment, one or more of the software program(s) 502 include instructions that, if executed, cause one or more hardware devices and/or circuits to perform one or more techniques further described in connection with FIGS. 1 through 4. In at least one embodiment, the system 500 includes one or more or all components of the server(s) 102 and/or the target device 200 described in relation to FIG. 1, and the system 500 may perform one or more or all of the processes and/or operations that the systems and components of the server(s) 102 and/or the target device 200 perform.

In at least one embodiment, the software program(s) 502, such as user-implemented software programs, utilize one or more of the API(s) 510 to perform various computing operations, such as memory reservation, matrix multiplication, arithmetic operations, and/or any computing operation performed by PPUs, such as GPUs, as further described herein. In at least one embodiment, the function(s) 512 include a set of callable functions provided by one or more of the API(s) 510 that are referred to herein as APIs, API functions, software functions, and/or functions, that individually perform one or more computing operations, such as computing operations related to parallel computing. In at least one embodiment, one or more of the API(s) 510 perform doorbell statistical data collection and analysis, and/or perform other operations described herein (e.g., in connection with FIGS. 1-4).

Figure 5B:
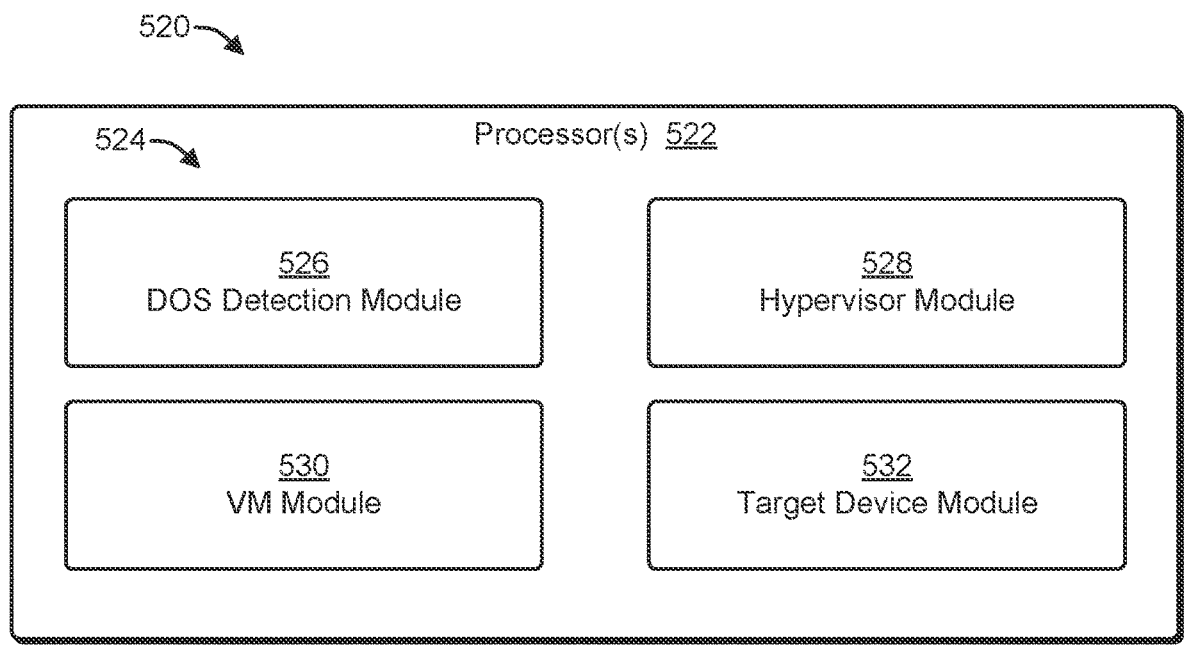
FIG. 5B is block diagram illustrating an example of a processor and modules, according to at least one embodiment.

In at least one embodiment, one or more of the software program(s) 502 interact or otherwise communicate with one or more of the API(s) 510 to perform one or more computing operations using one or more processors (e.g., processor(s) 522 illustrated in FIG. 5B), such as one or more PPUs, such as GPUs. In at least one embodiment, one or more computing operations using one or more PPUs include at least one or more groups of computing operations to be accelerated by execution at least in part by said one or more PPUs. In at least one embodiment, one or more of the software program(s) 502 interact with one or more of the API(s) 510 to perform doorbell analysis and/or hypervisor processing, and/or perform other operations described herein (e.g., in connection with FIGS. 1-4).

In at least one embodiment, an interface is software instructions that, if executed, provide access to one or more of the function(s) 512 provided by one or more of the API(s) 510. In at least one embodiment, one or more of the software program(s) 502 use(s) a local interface when a software developer compiles one or more of the software program(s) 502 in conjunction with one or more of the library(ies) 506 including or otherwise providing access to one or more of the API(s) 510. In at least one embodiment, one or more of the software program(s) 502 is/are compiled statically in conjunction with one or more pre-compiled ones of the library(ies) 506 and/or uncompiled source code including instructions to perform one or more of the API(s) 510. In at least one embodiment, one or more of the software program(s) 502 are compiled dynamically and the dynamically compiled software program(s) utilize a linker to link to one or more pre-compiled ones of the library(ies) 506, including one or more of the API(s) 510.

In at least one embodiment, one or more of the software program(s) 502 use(s) a remote interface when a software developer executes a software program that utilizes or otherwise communicates with at least one of the library(ies) 506 including one or more of the API(s) 510 over a network or other remote communication medium. In at least one embodiment, one or more of the library(ies) 506 including one or more of the API(s) 510 are to be performed by a remote computing service, such as a computing resource services provider. In at least one embodiment, one or more of the library(ies) 506 including one or more particular APIs (of the API(s) 510) is/are to be performed by any other computing host providing the particular API(s) to one or more of the software program(s) 502.

In at least one embodiment, a processor (e.g., processor(s) 522 illustrated in FIG. 5B) performing or using one or more particular ones of the software program(s) 502 calls, uses, performs, and/or otherwise implements one or more of the API(s) 510 to allocate and otherwise manage memory 514 to be used by the particular software program(s). In at least one embodiment, one or more particular ones of the software program(s) 502 utilize one or more of the API(s) 510 to allocate and otherwise manage the memory 514 to be used by one or more portions of the particular software program(s) to be accelerated using one or more PPUs, such as GPUs, or any other accelerator or processor further described herein. In at least one embodiment, one or more of the software program(s) 502 request one or more neural networks to perform signal processing using one or more of the function(s) 512 provided by one or more of the API(s) 510. In at least one embodiment, memory (e.g., the memory 204) within the server(s) 102 and/or target device 200 implements memory 514.

In at least one embodiment, one or more of the API(s) 510 is an API to facilitate parallel computing. In at least one embodiment, one or more of the API(s) 510 is any other API further described herein. In at least one embodiment, one or more of the API(s) 510 is/are provided by one or more of the driver(s) 504 and/or one or more of the runtime(s) 504. In at least one embodiment, one or more of the API(s) 510 is/are provided by a CUDA user-mode driver. In at least one embodiment, one or more of the API(s) 510 is/are provided by a CUDA runtime. In at least one embodiment, one or more of the driver(s) 504 is/are data values and software instructions that, if executed, perform and/or otherwise facilitate operation of one or more of the function(s) 512 of one or more of the API(s) 510 during load and execution of one or more portions of at least one of the software program(s) 502. In at least one embodiment, one or more of the runtime(s) 504 is/are data values and/or software instructions that, if executed, perform or otherwise facilitate operation of one or more of the function(s) 512 of one or more of the API(s) 510 during execution of at least one of the software program(s) 502. In at least one embodiment, one or more particular ones of the software program(s) 502 utilize one or more of the API(s) 510 implemented and/or otherwise provided by one or more of the driver(s) 504 and/or one or more of the runtime(s) 504 to perform combined arithmetic operations by the particular software program(s) during execution by one or more PPUs, such as GPUs.

In at least one embodiment, one or more of the software program(s) 502 utilize one or more of the API(s) 510 provided by one or more of the driver(s) 504 and/or one or more of the runtime(s) 504 to perform combined arithmetic operations of one or more PPUs, such as GPUs. In at least one embodiment, one or more of the API(s) 510 provide combined arithmetic operations through one or more of the driver(s) 504 and/or one or more of the runtime(s) 504, as described above. In at least one embodiment, one or more of the software program(s) 502 utilize one or more of the API(s) 510 provided by one or more of the driver(s) 504 and/or one or more of the runtime(s) 504 to allocate or otherwise reserve one or more blocks of the memory 514 of one or more PPUs, such as GPUs. In at least one embodiment, one or more of the software program(s) 502 utilize one or more of the API(s) 510 provided by one or more of the driver(s) 504 and/or one or more of the runtime(s) 504 to allocate or otherwise reserve blocks of the memory 514.

In at least one embodiment, to improve usability of one or more particular ones of the software program(s) 502 and/or improve performance, one or more portions of the particular software programs are to be accelerated by one or more PPUs (such as GPUs). In at least one embodiment, one or more of the function(s) 512 receive one or more input parameters indicating one or more inputs to one or more neural networks and/or other data to be utilized by the neural network(s), such as one or more hyperparameters of the neural network(s). In at least one embodiment, the input parameter(s) include the one or more inputs and/or the other data. In at least one embodiment, the input parameter(s) include one or more pointers to one or more memory locations where the input(s) and/or the other data is/are stored.

In at least one embodiment, the system 500 includes at least one processor (e.g., processor(s) 522 illustrated in FIG. 5B) including one or more circuits to perform one or more software programs to combine two or more of the API(s) 510 into a single API. In at least one embodiment, the system 500 includes at least one processor (e.g., processor(s) 522 illustrated in FIG. 5B) that uses one or more of the API(s) 510 to monitor address register statistics, resource utilization, and/or otherwise perform operations described herein. In at least one embodiment, the system 500 includes at least one processor (e.g., processor(s) 522 illustrated in FIG. 5B) that uses one or more of the API(s) 510 to perform one or more operations illustrated in and/or described with respect to one or more of FIGS. 1-4, such as one or more processes illustrated in FIGS. 3 and 4 or portion(s) thereof. In at least one embodiment, the system 500 includes at least one processor (e.g., processor(s) 522 illustrated in FIG. 5B) to perform one or more of the function(s) 512, such as those described in connection with the server(s) 102 (see FIG. 1) or the target device 200. In at least one embodiment, one or more of the API(s) 510 is to be performed by hardware described in connection with FIGS. 1-10.

FIG. 5B is block diagram 520 illustrating example processor(s) 522 and the module(s) 524, according to at least one embodiment. Referring to FIG. 5B, in at least one embodiment, the processor(s) 522 may be implemented by the processor(s) (e.g., the server(s) 102 and or target device 200). In at least one embodiment, the processor(s) 522 may perform one or more processes such as those described herein with respect to monitoring requests to access registers that may indicate an attempted DoS attack, and to monitor resource utilization, and/or may otherwise perform operations described herein. In at least one embodiment, the processor(s) 522 perform(s) one or more processes such as those described in connection with FIGS. 3 and 4.

In at least one embodiment, the processor(s) 522 include one or more processors such as those described in connection with FIGS. 1-10. In at least one embodiment, processor(s) 522 may be any suitable processing unit and/or combination of processing units, such as one or more CPUs, GPUs, DPUs, GPGPUs, PPUs, and/or variations thereof. The processor(s) 522 includes the module(s) 524, which may include a DoS detection module 526, a hypervisor module 528, a VM module 530, and/or a target device module 532. The DoS detection module 526 may implement the DoS detection functionality 210. The hypervisor module 528 may implement one or more of the hypervisor(s) 120. The VM module 530 may implement the VM driver 212. The target device module 532 may implement the target device driver 213. The module(s) 524 may be distributed among multiple processors that communicate over a bus, network, by writing to shared memory, and/or any suitable communication process such as those described herein. In at least one embodiment, the module(s) 524 (e.g., the DoS detection module 526) may include processor executable instructions that implement collection of doorbell statistics.

As used in any implementation described herein, unless otherwise clear from context or stated explicitly to contrary, a module refers to any combination of software logic, firmware logic, hardware logic, and/or circuitry configured to provide functionality described herein. Software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. Modules may, collectively or individually, be embodied as circuitry that forms part of a larger system, for example, an integrated circuit (IC), system on-chip (SoC), and so forth. a module performs one or more processes in connection with any suitable processing unit and/or combination of processing units, such as one or more CPUs, GPUs, GPGPUs, DPUs, PPUs, and/or variations thereof.

In at least one embodiment, as used in any implementation described herein, unless otherwise clear from context or stated explicitly to contrary, terms such as "module" and nominalized verbs (e.g., image manager, image analyzer, analytics engine, controller, and/or other terms) each refers to any combination of software logic, firmware logic, hardware logic, and/or circuitry configured to provide functionality described herein. In at least one embodiment, software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

Logic

Figure 6A:
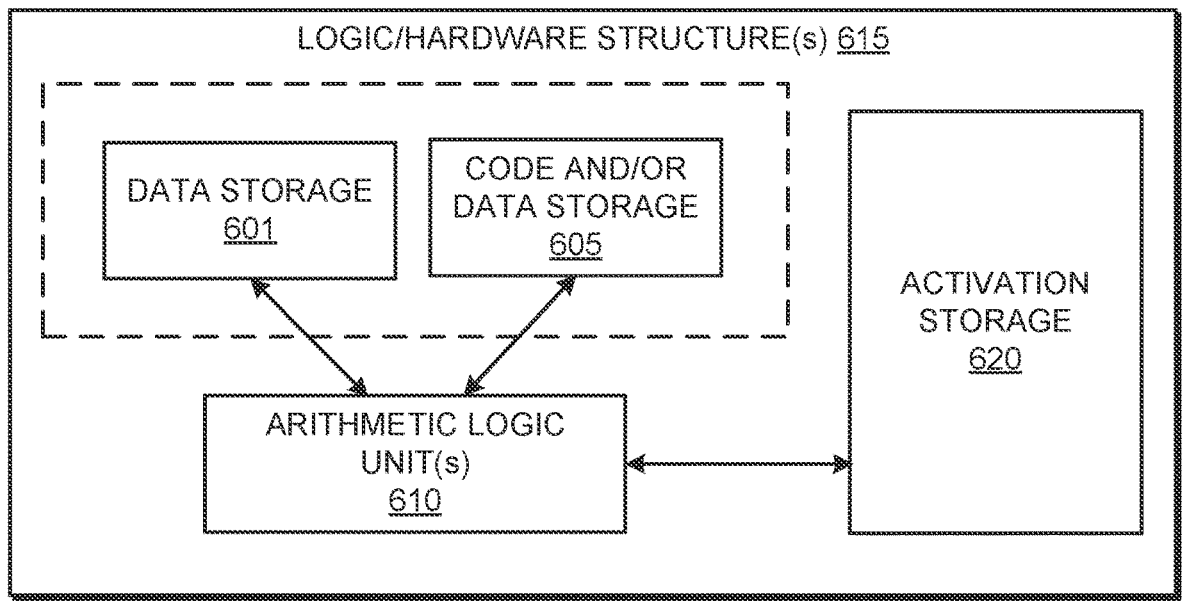
FIG. 6A illustrates logic, according to at least one embodiment.

FIG. 6A illustrates logic 615 which, as described elsewhere herein, can be used in one or more devices to perform operations such as those discussed herein in accordance with at least one embodiment. In at least one embodiment, logic 615 is used to perform inferencing and/or training operations associated with one or more embodiments. In at least one embodiment, logic 615 is inference and/or training logic. Details regarding logic 615 are provided below in conjunction with FIGS. 6A and/or 6B. In at least one embodiment, logic refers to any combination of software logic, hardware logic, and/or firmware logic to provide functionality or operations described herein, wherein logic may be, collectively or individually, embodied as circuitry that forms part of a larger system, for example, an integrated circuit (IC), system-on-chip (SoC), or one or processors (e.g., CPU, GPU).

In at least one embodiment, logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 601 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to one or more processors or other hardware logic devices or circuits. In at least one embodiment, code and/or data storage 605 may be cache memory, DRAM, SRAM, non-volatile memory (e.g., flash memory), or other storage. In at least one embodiment, a choice of whether code and/or data storage 605 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be a combined storage structure. In at least one embodiment, code and/or data storage 601 and code and/or data storage 605 may be partially combined and partially separate. In at least one embodiment, any portion of code and/or data storage 601 and code and/or data storage 605 may be included with other on-chip or off-chip data storage, including a processor's L1, L2, or L3 cache or system memory.

In at least one embodiment, logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., flash memory), or other storage. In at least one embodiment, activation storage 620 may be completely or partially within or external to one or more processors or other logical circuits. In at least one embodiment, a choice of whether activation storage 620 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, logic 615 illustrated in FIG. 6A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, logic 615 illustrated in FIG. 6A may be used in conjunction with central processing unit ("CPU") hardware, graphics processing unit ("GPU") hardware or other hardware, such as field programmable gate arrays ("FPGAs").

Figure 6B:
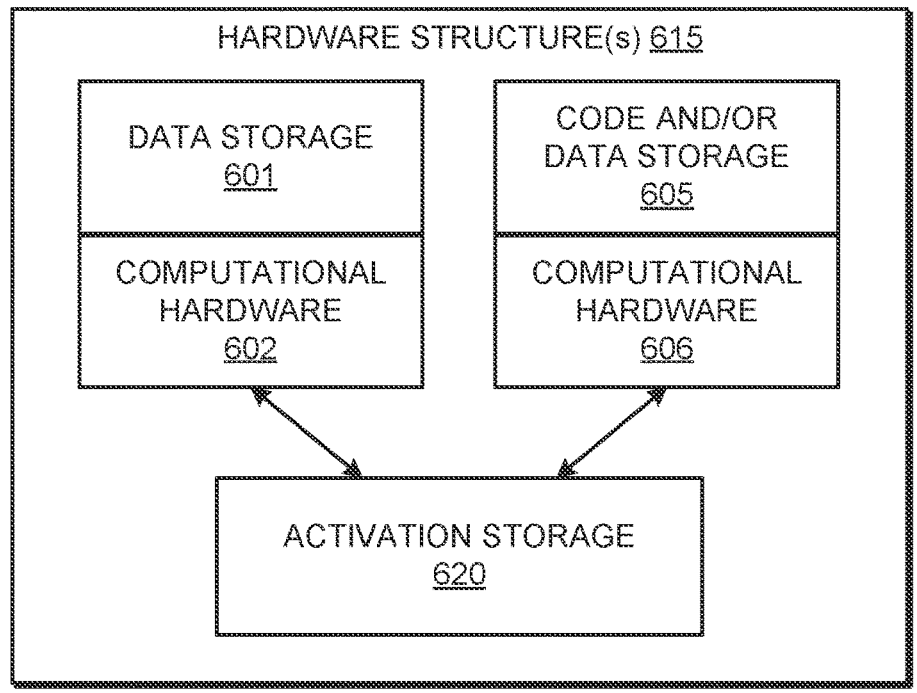
FIG. 6B illustrates logic, according to at least one embodiment.

FIG. 6B illustrates logic 615, according to at least one embodiment. In at least one embodiment, logic 615 is inference and/or training logic. In at least one embodiment, logic 615 may include, without limitation, hardware logic in which computational resources are dedicated or otherwise exclusively used in conjunction with weight values or other information corresponding to one or more layers of neurons within a neural network. In at least one embodiment, logic 615 illustrated in FIG. 6B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, logic 615 illustrated in FIG. 6B may be used in conjunction with central processing unit (CPU) hardware, graphics processing unit (GPU) hardware or other hardware, such as field programmable gate arrays (FPGAs). In at least one embodiment, logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 includes one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one storage/computational pair 601/602 of code and/or data storage 601 and computational hardware 602 is provided as an input to a next storage/computational pair 605/606 of code and/or data storage 605 and computational hardware 606, in order to mirror a conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage/computation pairs 601/602 and 605/606 may be included in logic 615.

In at least one embodiment, the target device 200 may be implemented using the hardware structures 615 illustrated in FIG. 6. The data storage 601 and computational hardware 602 can implement the OS 208 while the code/data storage 605 and computational hardware 606 can implement the data register utilization.

Data Center

Figure 7:
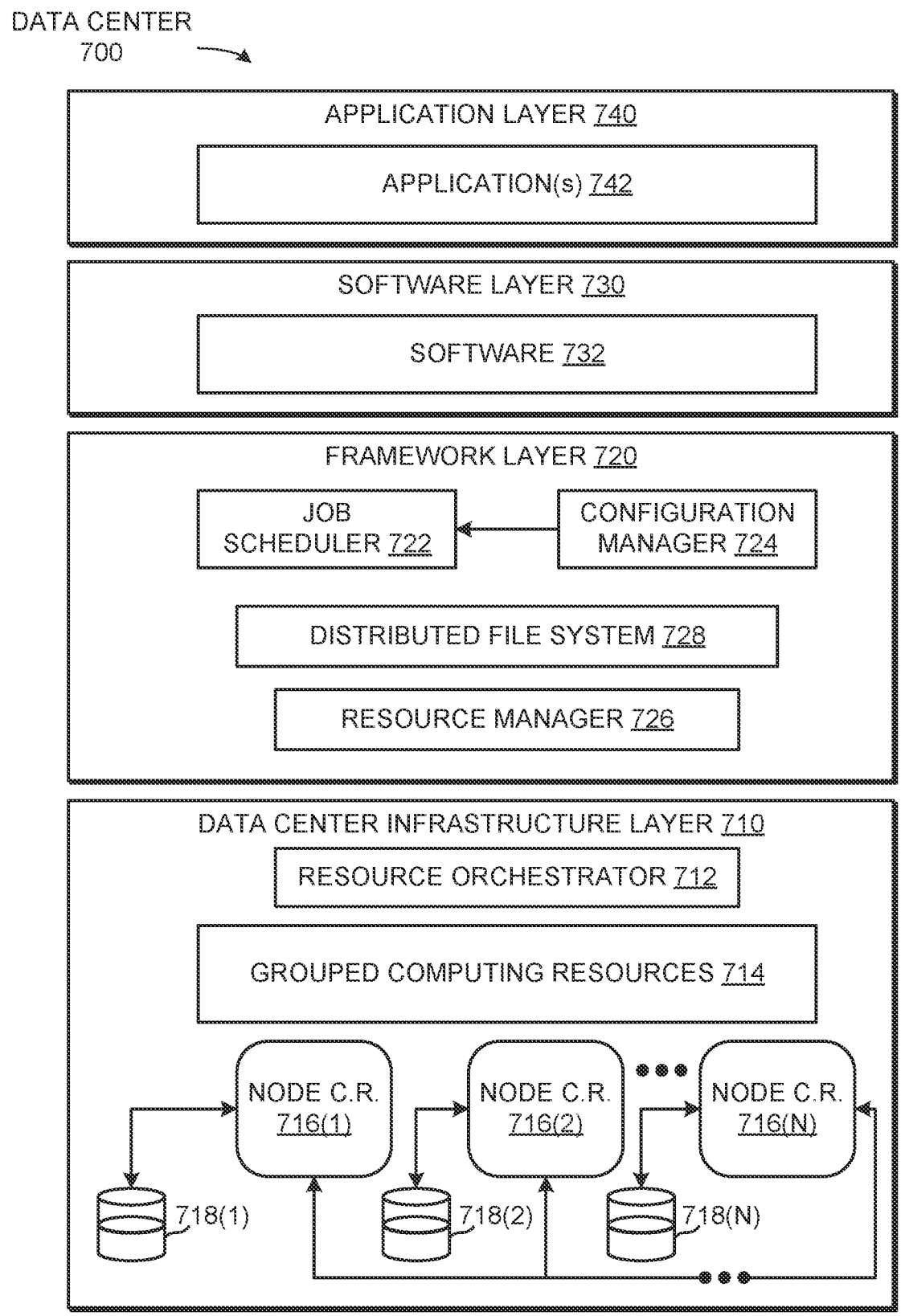
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator 712 may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Logic 615 are used to perform inferencing and/or training operations associated with one or more embodiments. Details regarding logic 615 are provided herein in conjunction with FIGS. 6A and/or 6B. In at least one embodiment, logic 615 may be used in data center 700 for inferencing or predicting operations based, at least in part, on weight parameters calculated using neural network training operations, neural network functions and/or architectures, or neural network use cases described herein.

In at least one embodiment, the system 100 (e.g., the data center 104) is implemented as a data center, such as the example data center 700 illustrated in FIG. 7. In this embodiment, the server(s) 102, the virtual machine 230, and the target device 200 are all implemented as part of the data center 700. As noted above, FIG. 1 may typically include a large number of virtual machines like the VM 230 that are controlled by the server(s) 102 and the hypervisor(s) 120.

Computer Systems

Figure 8:
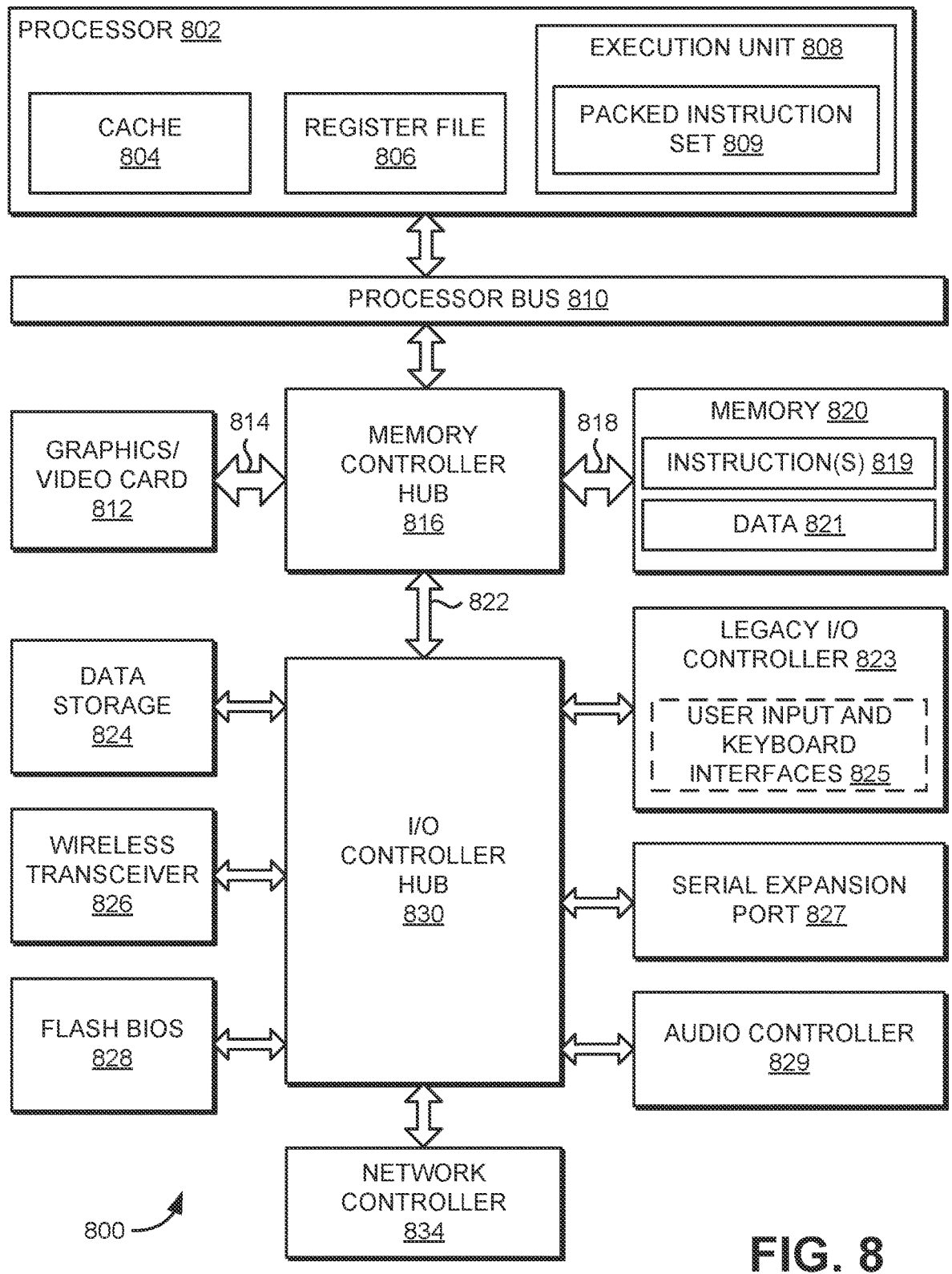
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may include a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Logic 615 are used to perform inferencing and/or training operations associated with one or more embodiments. Details regarding logic 615 are provided herein in conjunction with FIGS. 6A and/or 6B. In at least one embodiment, logic 615 may be used in computer system 800 for inferencing or predicting operations based, at least in part, on weight parameters calculated using neural network training operations, neural network functions and/or architectures, or neural network use cases described herein.

In at least one embodiment, components such as the OS 208 may be implemented by Microsoft Windows while the processor(s) 202 (e.g., CPU) may be a SoC or microprocessor from those listed above. However, the system 100 is not limited by the specific processor or the specific operating system.

Figure 9:
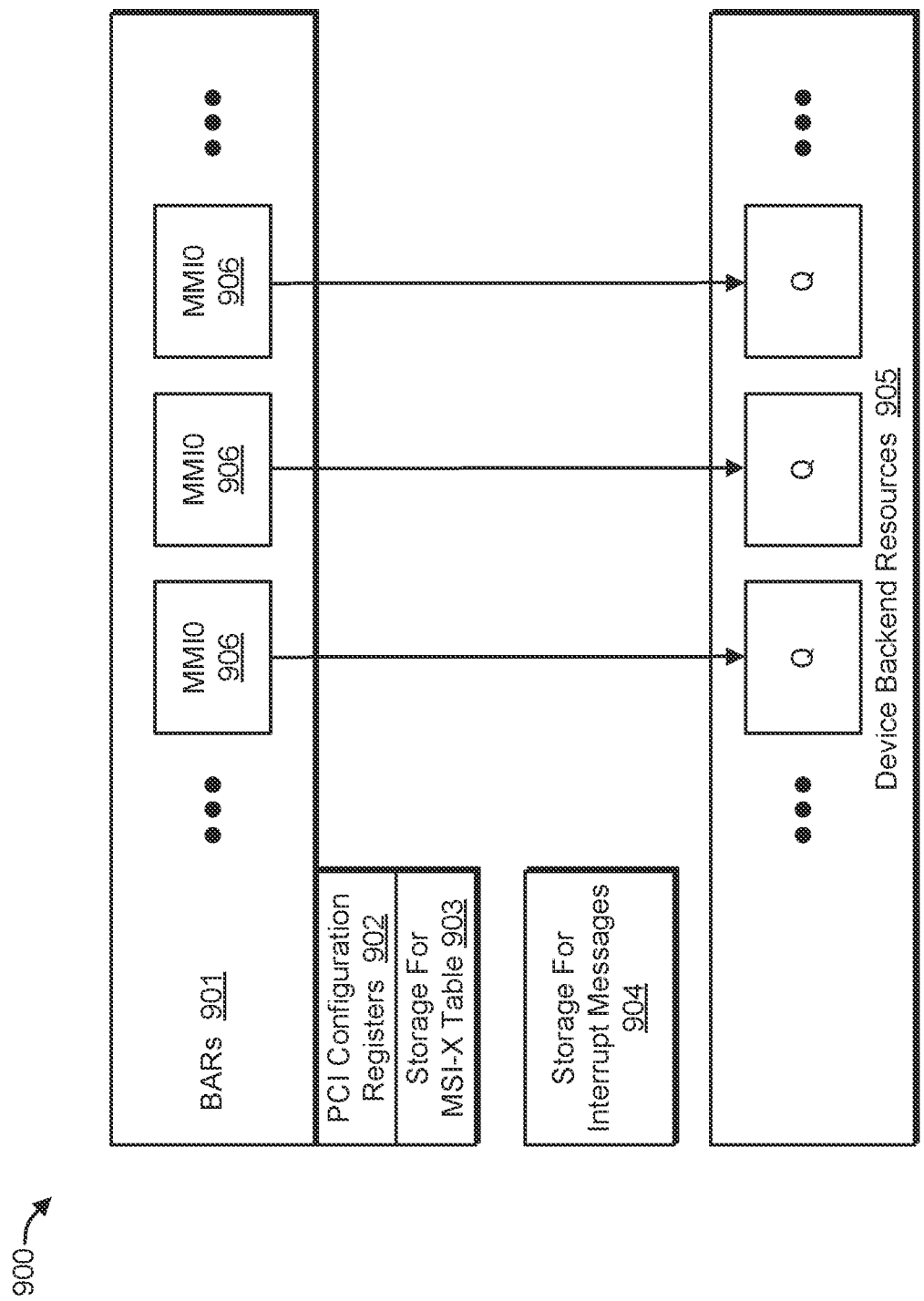
FIG. 9 is a block diagram illustrating an example device, according to at least one embodiment.

FIG. 9 is a block diagram illustrating a device 900, according to at least one embodiment. In at least one embodiment, the device 900 is implemented as a network device, a Network Interface Controller, a network adapter, an accelerator (e.g., a data streaming accelerator ("DSA"), a custom fixed function unit, or a tailored programmable unit), and/or other type of device (e.g., an I/O device). The device 900 may be implemented as a PCI device that has a set of registers collectively referred to as a configuration space. The registers of the configuration space may be mapped to memory locations. The configuration space may help enable auto configuration of the device 900 when the device 900 is connected to (e.g., inserted into) a bus, such as a PCI bus, PCI-X bus, and a PCI Express bus, and/or the like.

In at least one embodiment, the device 900 includes one or more PCI configuration registers 902 (e.g., one or more physical function configuration registers) and one or more Memory-mapped Input/Output (MMIO) registers 906, which may be programmed to provide access to one or more backend resources 905 of the device 900. In at least one embodiment, the base addresses for the MMIO registers 906 are specified by a set of Base Address Registers (BARs) 901 in PCI configuration space. In at least one embodiment, the device 900 may provide additional performance and/or include debug registers.

In at least one embodiment, the PCI configuration space accesses are performed as aligned 1-byte, 2-byte, or 4-byte accesses. In at least one embodiment, MMIO space accesses to the BAR0 region (capability, configuration, and status registers) are performed as aligned 1-byte, 2-byte, 4-byte, or 8-byte accesses.

In at least one embodiment, PCI configuration space implements three 64-bit BARs 901. In at least one embodiment, the Device Control Register (BAR0) is a 64-bit BAR that contains a physical base address of one or more device control registers. In at least one embodiment, these registers provide information about device capabilities, controls to configure and enable the device, and device status. In at least one embodiment, the size of the BAR0 region is dependent on the size of a storage 904 for interrupt messages. In at least one embodiment, the size is 32 KB plus a number of entries in the storage 904 multiplied by 16, rounded up to the next power of two. For example, if the device supports 1024 entries in the storage 904, the storage 904 is 16 KB, and the size of BAR0 is 64 KB.

In at least one embodiment, BAR2 is a 64-bit BAR that contains a physical base address of Privileged and Non-Privileged Portals. In at least one embodiment, each portal is 64-bytes in size and is located on a separate 4 KB page. In at least one embodiment, this allows the portals to be independently mapped into different address spaces using CPU page tables. In at least one embodiment, the portals are used to submit descriptors to the device 900. In at least one embodiment, the Privileged Portals may be used by kernel-mode software, and the Non-Privileged Portals may be used by user-mode software. In at least one embodiment, the number of portals in the BAR2 region is a number of Work Queues (WQs) supported by the device 900 multiplied by the size of a MSI-X table stored by storage 903 for the MSI-X table. The size of the MSI-X table is typically the number of WQs plus 1. So, for example, if the device 900 supports eight WQs, the useful size of BAR2 would be 8×9×4 KB=288 KB. The total size of BAR2 may be rounded up to the next power of two, or 512 KB.

BAR4 is a 64-bit BAR that may contain a physical base address of one or more Guest Portals. Each Guest Portal may be 64-bytes in size and be located in a separate 4 KB page. This allows the portals to be independently mapped into different address spaces using CPU extended page tables (EPT). In at least one embodiment, the BAR4 is not implemented. The Guest Portals may be used by guest kernel-mode software to submit descriptors to the device 900. The number of Guest Portals is the number of entries in a storage 904 for interrupt messages multiplied by the number of WQs supported. The address of the Guest Portal used to submit a descriptor allows the device 900 to determine the WQ for the descriptor and also the entry in the storage 904 to use to generate a completion interrupt for the descriptor completion (if it is a kernel-mode descriptor, and if the Request Completion Interrupt flag is set in the descriptor). For example, if the device supports eight WQs, the WQ for a given descriptor is (Guest-portal-address>>12) & 0x7, and the interrupt table entry index used for the completion interrupt is Guest-portal-address>>15.

In at least one embodiment, three PCI Express capabilities control address translation. Each of the PCI Express capabilities may be controlled by a value (e.g., zero or one) that may checked at a time an Enable bit in a General Control Register (GENCTRL) is set to 1. The PCI Express capabilities may include a PASID capability, an address translation services (ATS) capability, and a page request services (PRS) capability. In at least one embodiment, software configures the PASID capability to control whether the device uses PASID to perform address translation. If PASID is disabled, only physical addresses may be used. If PASID is enabled, virtual or physical addresses may be used, depending on IOMMU configuration. In at least one embodiment, if PASID is enabled, both the ATS and the PRS capabilities should be enabled.

In at least one embodiment, software configures the ATS capability to control whether the device should translate addresses before performing memory accesses. In at least one embodiment, if address translation is enabled in the IOMMU, the ATS must be enabled in the device to obtain acceptable system performance. In at least one embodiment, if address translation is not enabled in the IOMMU, the ATS must be disabled. In at least one embodiment, if ATS is disabled, only physical addresses may be used and all memory accesses are performed using Untranslated Accesses. ATS must be enabled if PASID is enabled.

In one implementation, software configures the PRS capability to control whether the device can request a page when an address translation fails. PRS must be enabled if PASID is enabled, and must be disabled if PASID is disabled.

In at least one embodiment, the device 900 may utilize a virtual memory space that is seamlessly shared between one or more processor cores, accelerator devices, and/or other types of processing devices (e.g., I/O devices). In at least one embodiment, the device 900 may utilize a shared virtual memory (SVM) architecture in which the same virtual memory space is shared between cores, accelerator devices, and/or other processing devices. In at least one embodiment, the device 900 may include heterogeneous forms of physical system memory which are addressed using a common virtual memory space. The heterogeneous forms of physical system memory may use different physical interfaces. For example, an accelerator device may be directly coupled to local accelerator memory such as a high bandwidth memory (HBM) and each core may be directly coupled to a host physical memory such as a dynamic random access memory (DRAM). In this example, the shared virtual memory (SVM) is mapped to the combined physical memory of the HBM and DRAM so that the accelerator, processor cores, and/or other processing devices can access the HBM and DRAM using a consistent set of virtual memory addresses.

In at least one embodiment, for PCI and PCIe, the basic format of the configuration space of an I/O resource (e.g., a network device) typically includes a configuration header, one or more BARs, and some additional control fields. The format and fields of the configuration header typically depends on the type (device or bridge) of the corresponding I/O resource, but generally include fields for storing a device identifier (e.g., a bus-device-function (BDF) identifier), a vendor identifier, a header type, and the like. Each BAR, after enumeration, identifies the base address of a corresponding MMIO address range assigned to the I/O resource. For PCIe, the configuration space further may include one or more extended capability structures, such as a resizable BAR extended capability structure that allows the I/O resource to present multiple size options, an SR-IOV extended capability structure that facilitates management of one or more virtual functions ("VFs") associate with one or more physical functions ("PFs"), and/or the like.

In at least one embodiment, a hypervisor has control of the configuration spaces of the I/O resources of an I/O subsystem in order to facilitate resource allocation, such as MMIO address allocation at initial configuration, programming the bus-device-functions of the various PFs and VFs, assigning or removing a device to or from a VM, and the like. In at least one embodiment, the hypervisor switches between PFs and VFs to serve different operating systems. In at least one embodiment, a queue may be used to serve multiple different operating systems concurrently, whether in PF or VF. In other words, the queue can accept work requests from different operating systems, including from a host OS and one or more guest operating systems.

In at least one embodiment, the device 900 may be implemented as the target device 200 of FIG. 2 and may include a set of registers collectively referred to as a configuration space. In at least one embodiment, the base addresses for the MMIO registers 906 are specified by a set of Base Address Registers (BARs) 901 in PCI configuration space. This may be used to implement the BAR(s) 224 illustrated in FIG. 2.

Figure 10:
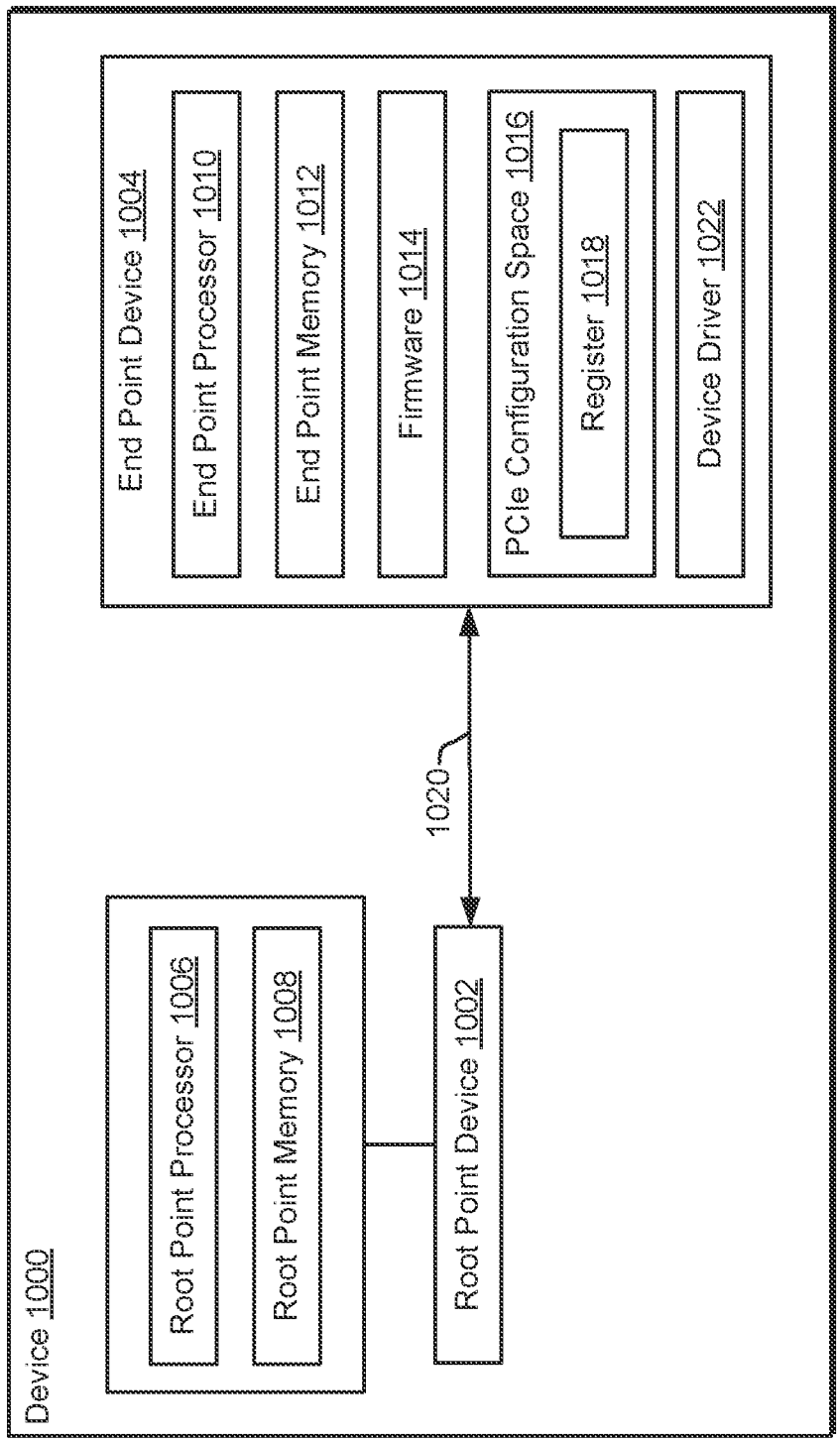
FIG. 10 is a block diagram illustrating example components of a device of a PCIe network, according to at least one embodiment.

FIG. 10 is a block diagram illustrating a device 1000, according to at least one embodiment. In at least one embodiment, the device 1000 (e.g., one device in a network) is a component of a PCIe network in which one or more features described herein may be implemented. In at least one embodiment, the device 1000 includes a root point device 1002, an end point device 1004, and a PCIe link 1020. The PCIe link 1020 is a point-to-point (e.g., end point to root point) communication channel, which includes one or more lanes for allowing the root point device 1002 and the end point device 1004 to communicate PCIe traffic between one another. PCIe traffic includes any data sent across the PCIe link, such as messages, which include memory access requests (e.g., read and write access requests), LTR reporting values and interrupts. PCIE traffic includes, for example, DMA (reading data from memory data and writing data to memory) between local memory (e.g., end point memory) and root point memory (e.g., main memory).

The root point device 1002 is, for example, a root complex which includes a plurality of root points (e.g., root ports) each connecting the internal hardware, such as a root point processor 1006 (e.g., CPU) and root point memory (e.g., main memory) 1008, to a plurality of end point devices, such as end point device via PCIe link 1020. For simplified explanation, FIG. 10 shows the root point device 1002 connected to a single end point device 1004 via PCIe link 1020.

The end point device 1004 is, for example, a peripheral hardware device (e.g., graphics device, Ethernet device or USB device) which communicates with the root point processor 1006 and the root point memory 1008 via the PCIe link 1020. The end point device 1004 includes end point processor 1010, end point memory 1012, firmware 1014, and PCIe configuration space 1016 (e.g., PCIe configuration instructions).

The end point processor 1010 is configured to perform a plurality of functions, such as executing instructions to control operation of the end point device 1004, sending messages over the PCIe link 1020 to the root point processor 1006 (e.g., one or more CPU core) of the root point device 1002, which includes, for example, a request (read request, write request) to access the root point memory 1008 (e.g., main memory).

Firmware 1014 is used to store instructions for a plurality of program portion types (e.g., workload types to control operation of the end point device 1004 and provide an interface between the hardware (e.g., the end point processor 1010 and the end point memory 1012) of the end point device 1004 and device driver 1022.

Register 1018 of the PCIe configuration space 1016 represents a set of registers used to map the end point device 1004 to memory addresses (e.g., mapping the end point device 1004 to I/O port address space or memory-mapped address space). Base Address Registers (BARs) are programmed by firmware 1014 (e.g. BIOS) or the operating system of the device 1000 to inform the device 1000 of its resource configuration by writing configuration commands to a PCI controller. PCIe buses are enumerate to determine which PCI slots have devices (e.g., the end point device 1004).

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory and/or secondary storage such as those described herein. Computer programs, if executed by one or more processors, enable at least one system described herein to perform various functions in accordance with at least one embodiment. In at least one embodiment, memory, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of a CPU such as those described herein, a parallel processing system such as those described herein, an integrated circuit capable of at least a portion of capabilities of both the CPU, the parallel processing system, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, a computer system described herein may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic. In at least one embodiment, a computer system includes or refers to any devices illustrated in any of the drawings and/or described herein.

In at least one embodiment, a parallel processing system includes, without limitation, a plurality of parallel processing units ("PPUs") and associated memories. In at least one embodiment, PPUs are connected to a host processor or other peripheral devices via an interconnect and a switch or multiplexer. In at least one embodiment, a parallel processing system distributes computational tasks across the PPUs, which can be parallelizable—for example, as part of distribution of computational tasks across multiple graphics processing unit ("GPU") thread blocks. In at least one embodiment, memory is shared and accessible (e.g., for read and/or write access) across some or all of the PPUs, although such shared memory may incur performance penalties relative to use of local memory and registers resident to a PPU. In at least one embodiment, operation of the PPUs is synchronized through use of a command such as _syncthreads( ), wherein all threads in a block (e.g., executed across multiple PPUs) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as one VPL, is a library that is utilized for accelerating video processing in one or more applications. In at least one embodiment, oneVPL implements various video decoding, encoding, and processing functions. In at least one embodiment, one VPL implements various functions for media pipelines on CPUs, GPUs, and other accelerators. In at least one embodiment, one VPL implements device discovery and selection in media centric and video analytics workloads. In at least one embodiment, one VPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation includes generating one or more machine-executable instructions, operations, or other signals from source code. In at least one embodiment, an API compiled into one or more instructions, operations, or other signals, when performed, causes one or more processors, such as graphics processors, graphics cores, parallel processor, a CPU, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

At least one embodiment of the disclosure can be described in view of the following clauses:

1. A system comprising one or more circuits to determine a target is potentially under attack by an entity based at least in part on a number of communications sent to one or more memory addresses mapped by one or more registers associated with the target; and send a notification to prevent the entity from sending additional communications to the one or more memory addresses in response to determining the target is potentially under attack, the target comprising at least one of hardware or firmware.
2. The system of clause 1, wherein the entity is a virtual function ("VF") being performed by a virtual machine ("VM") managed by a hypervisor.
3. The system of clause 2, wherein the notification is sent to the hypervisor, the notification being a notification to disconnect the VM.
5. The system of clause 3, wherein disconnecting the VM comprises terminating the VM.
4. The system of clause 3, wherein disconnecting the VM comprises disabling the VF to prevent the VF from sending additional communications to the to one or more memory addresses.
6. The system of clause 1, wherein determining the target is potentially under attack is based at least in part on the number of communications comprises determining a rate at which the communications are received, and comparing the rate to a threshold rate value.
7. The system of clause 6, wherein determining the rate comprises calculating the rate based only on any of the communications determined not to be valid communications.
8. The system of clause 1, wherein determining the target is potentially under attack by the entity is based at least in part on a number of communications sent to one or more memory addresses mapped by one or more registers associated with the target.
9. The system of clause 8, wherein the one or more registers associated with the target comprise a plurality of base address registers.
10. The system of clause 1, wherein determining the target is potentially under attack by the entity is based at least in part on a number of communications sent to one or more memory addresses mapped to one or more registers that the entity is not authorized to access.
11. The system of clause 1, wherein a plurality of additional entities send an additional number of communications to one or more memory addresses mapped to one or more registers, and determining the target is potentially under attack by the entity is based at least in part on a number of communications sent by the entity to one or more memory addresses mapped to one or more registers compared to a number of additional communications sent to one or more memory addresses mapped to one or more registers by the plurality of additional entities.
12. A method comprising determining a target is potentially under attack by an entity based at least in part on a number of communications sent to one or more memory addresses mapped to one or more registers associated with the target; and sending a notification to prevent the entity from sending additional communications to the one or more memory addresses in response to determining the target is potentially under attack.
13. The method of clause 12, wherein the target comprises at least one of hardware or firmware.
14. The method of clause 12, wherein the entity is a virtual function ("VF") being performed by a virtual machine ("VM") managed by a hypervisor.
15. The method of clause 14, wherein sending the notification comprises sending the notification to the hypervisor, the notification being a notification to disconnect the VM.
16. The method of clause 15, wherein disconnecting the VM comprises disabling the VF to prevent the VF from sending additional communications to the to one or more memory addresses.
17. The method of clause 15, wherein disconnecting the VM comprises terminating the VM.
18. The method of clause 12, wherein determining a target is potentially under attack comprises determining a rate at which the communications are received, and comparing the rate to a threshold rate value.
19. The method of clause 18, wherein determining the rate comprises calculating the rate based only on any of the communications determined not to be valid communications.
20. The method of clause 12, wherein determining the target is potentially under attack by the entity comprises determining a number of communications sent to one or more memory addresses mapped to one or more registers associated with the target.
21. The method of clause 20, wherein the one or more registers associated with the target comprise a plurality of base address registers.
22. The method of clause 12, wherein determining the target is potentially under attack by the entity comprises determining a number of communications sent to one or more memory addresses mapped to one or more registers that the entity is not authorized to access.
23. The method of clause 12, wherein a plurality of additional entities send an additional number of communications to one or more memory addresses mapped to one or more registers, and determining the target is potentially under attack by the entity comprises determining a number of communications sent by the entity to one or more memory addresses mapped to one or more registers compared to a number of additional communications sent to one or more memory addresses mapped to one or more registers by the plurality of additional entities.

24. A machine-readable medium for use with a computer network, the machine-readable medium having stored thereon a set of instructions, which if performed by one or more processors, cause the one or more processors to at least determining a target is potentially under attack by an entity based at least in part on a number of communications sent to one or more memory addresses mapped to one or more registers associated with the target; and sending a notification to prevent the entity from sending additional communications to the one or more memory addresses in response to determining the target is potentially under attack.

25. The machine-readable medium of clause 24, wherein the target comprises at least one of hardware or firmware.

26. The machine-readable medium of clause 24, wherein the entity is a virtual function ("VF") being performed by a virtual machine ("VM") managed by a hypervisor.

27. The machine-readable medium of clause 26, wherein sending the notification comprises sending the notification to the hypervisor, the notification being a notification to disconnect the VM.

28. The machine-readable medium of clause 27, wherein disconnecting the VM comprises disabling the VF to prevent the VF from sending additional communications to the to one or more memory addresses.

29. The machine-readable medium of clause 27, wherein disconnecting the VM comprises terminating the VM.

30. The machine-readable medium of clause 24, wherein the set of instructions, which if performed by the one or more processors, cause the one or more processors to at least determine a target is potentially under attack comprises determining a rate at which the communications are received, and comparing the rate to a threshold rate value.

31. The machine-readable medium of clause 30, wherein determining the rate comprises calculating the rate based only on any of the communications determined not to be valid communications.

32. The machine-readable medium of clause 24, wherein determining the target is potentially under attack by the entity comprises determining a number of communications sent to one or more memory addresses mapped to one or more registers associated with the target.

33. The machine-readable medium of clause 32, wherein the one or more registers associated with the target comprise a plurality of base address registers.

34. The machine-readable medium of clause 24, wherein the set of instructions, which if performed by the one or more processors, cause the one or more processors to at least determine the target is potentially under attack by the entity by determining a number of communications sent to one or more memory addresses mapped to one or more registers that the entity is not authorized to access.

35. The machine-readable medium of clause 24, wherein a plurality of additional entities send an additional number of communications to one or more memory addresses mapped to one or more registers the set of instructions, which if performed by the one or more processors, cause the one or more processors to at least determine the target is potentially under attack by the entity by determining a number of communications sent by the entity to one or more memory addresses mapped to one or more registers compared to a number of additional communications sent to one or more memory addresses mapped to one or more registers by the plurality of additional entities.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still cooperate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
   one or more circuits to:
   determine a target is potentially under attack by an entity based at least in part on a number of communications sent to one or more memory addresses mapped by one or more registers associated with the target; and
   send a notification to prevent the entity from sending additional communications to the one or more memory addresses in response to determining the target is potentially under attack, the target comprising at least one of hardware or firmware.

2. The system of claim 1, wherein the entity is a virtual function ("VF") being performed by a virtual machine ("VM") managed by a hypervisor.

3. The system of claim 2, wherein the notification is sent to the hypervisor, the notification being a notification to disconnect the VM.

4. The system of claim 3, wherein disconnecting the VM comprises disabling the VF to prevent the VF from sending additional communications to the to one or more memory addresses.

5. The system of claim 3, wherein disconnecting the VM comprises terminating the VM.

6. The system of claim 1, wherein determining the target is potentially under attack is based at least in part on the number of communications comprises determining a rate at which the communications are received, and comparing the rate to a threshold rate value.

7. The system of claim 6, wherein determining the rate comprises calculating the rate based only on any of the communications determined not to be valid communications.

8. The system of claim 1, wherein determining the target is potentially under attack by the entity is based at least in part on a number of communications sent to one or more memory addresses mapped by the one or more registers associated with the target.

9. The system of claim 8, wherein the one or more registers associated with the target comprise a plurality of base address registers.

10. The system of claim 1, wherein determining the target is potentially under attack by the entity is based at least in part on a number of communications sent to one or more memory addresses mapped to one or more registers that the entity is not authorized to access.

11. The system of claim 1, wherein a plurality of additional entities send an additional number of communications to one or more memory addresses mapped to one or more registers, and determining the target is potentially under attack by the entity is based at least in part on a number of communications sent by the entity to one or more memory addresses mapped to one or more registers compared to a number of additional communications sent to one or more memory addresses mapped to one or more registers by the plurality of additional entities.

12. A method comprising:
    determining a target is potentially under attack by an entity based at least in part on a number of communications sent to one or more memory addresses mapped to one or more registers associated with the target; and
    sending a notification to prevent the entity from sending additional communications to the one or more memory addresses in response to determining the target is potentially under attack.

13. The method of claim 12, wherein the target comprises at least one of hardware or firmware.

14. The method of claim 12, wherein the entity is a virtual function ("VF") being performed by a virtual machine ("VM") managed by a hypervisor.

15. The method of claim 14, wherein sending the notification comprises sending the notification to the hypervisor, the notification being a notification to disconnect the VM.

16. The method of claim 15, wherein disconnecting the VM comprises disabling the VF to prevent the VF from sending additional communications to the to one or more memory addresses.

17. The method of claim 15, wherein disconnecting the VM comprises terminating the VM.

18. The method of claim 12, wherein determining a target is potentially under attack comprises determining a rate at which the communications are received, and comparing the rate to a threshold rate value.

19. The method of claim 18, wherein determining the rate comprises calculating the rate based only on any of the communications determined not to be valid communications.

20. The method of claim 12, wherein determining the target is potentially under attack by the entity comprises determining a number of communications sent to one or more memory addresses mapped to one or more registers associated with the target.

21. The method of claim 20, wherein the one or more registers associated with the target comprise a plurality of base address registers.

22. The method of claim 12, wherein determining the target is potentially under attack by the entity comprises determining a number of communications sent to one or more memory addresses mapped to one or more registers that the entity is not authorized to access.

23. The method of claim 12, wherein a plurality of additional entities send an additional number of communications to one or more memory addresses mapped to one or more registers, and determining the target is potentially under attack by the entity comprises determining a number of communications sent by the entity to one or more memory addresses mapped to one or more registers compared to a number of additional communications sent to one or more memory addresses mapped to one or more registers by the plurality of additional entities.

24. A non-transitory machine-readable medium for use with a computer network, the non-transitory machine readable medium having stored thereon a set of instructions, which if performed by one or more processors, cause the one or more processors to at least:
    determining a target is potentially under attack by an entity based at least in part on a number of communications sent to one or more memory addresses mapped to one or more registers associated with the target; and
    sending a notification to prevent the entity from sending additional communications to the one or more memory addresses in response to determining the target is potentially under attack.

25. The non-transitory machine-readable medium of claim 24, wherein the target comprises at least one of hardware or firmware.

26. The non-transitory machine-readable medium of claim 24, wherein the entity is a virtual function ("VF") being performed by a virtual machine ("VM") managed by a hypervisor.

27. The non-transitory machine-readable medium of claim 26, wherein sending the notification comprises sending the notification to the hypervisor, the notification being a notification to disconnect the VM.

28. The non-transitory machine-readable medium of claim 27, wherein disconnecting the VM comprises disabling the VF to prevent the VF from sending additional communications to the to one or more memory addresses.

29. The non-transitory machine-readable medium of claim 27, wherein disconnecting the VM comprises terminating the VM.

30. The non-transitory machine-readable medium of claim 24, wherein the set of instructions, which if performed by the one or more processors, cause the one or more processors to at least determine a target is potentially under attack comprises determining a rate at which the communications are received, and comparing the rate to a threshold rate value.

31. The non-transitory machine-readable medium of claim 30, wherein determining the rate comprises calculating the rate based only on any of the communications determined not to be valid communications.

32. The non-transitory machine-readable medium of claim 24, wherein determining the target is potentially under attack by the entity comprises determining a number of communications sent to one or more memory addresses mapped to one or more registers associated with the target.

33. The non-transitory machine-readable medium of claim 32, wherein the one or more registers associated with the target comprise a plurality of base address registers.

34. The non-transitory machine-readable medium of claim 24, wherein the set of instructions, which if performed by the one or more processors, cause the one or more processors to at least determine the target is potentially under attack by the entity by determining a number of communications sent to one or more memory addresses mapped to one or more registers that the entity is not authorized to access.

35. The non-transitory machine-readable medium of claim 24, wherein a plurality of additional entities send an additional number of communications to one or more memory addresses mapped to one or more registers the set of instructions, which if performed by the one or more processors, cause the one or more processors to at least determine the target is potentially under attack by the entity by determining a number of communications sent by the entity to one or more memory addresses mapped to one or more registers compared to a number of additional communications sent to one or more memory addresses mapped to one or more registers by the plurality of additional entities.

* * * * *